April 7, 1959 G. B. KELLEY 2,880,847
FLEXIBLE CONVEYOR
Filed April 21, 1955 3 Sheets-Sheet 1

INVENTOR.
George B. Kelley
BY
*McGrew & Edwards*
ATTORNEYS

April 7, 1959

G. B. KELLEY 2,880,847

FLEXIBLE CONVEYOR

Filed April 21, 1955

INVENTOR.
George B. Kelley
BY

ATTORNEYS

April 7, 1959     G. B. KELLEY     2,880,847
FLEXIBLE CONVEYOR
Filed April 21, 1955     3 Sheets-Sheet 3
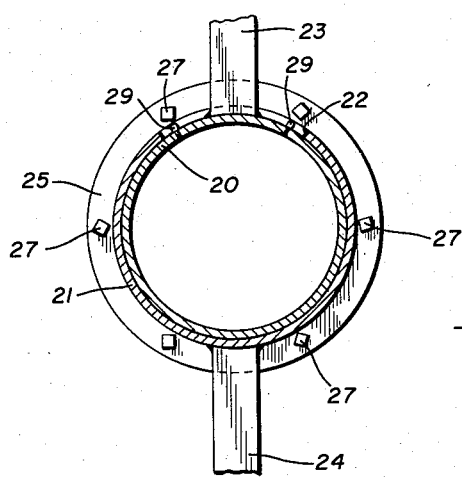
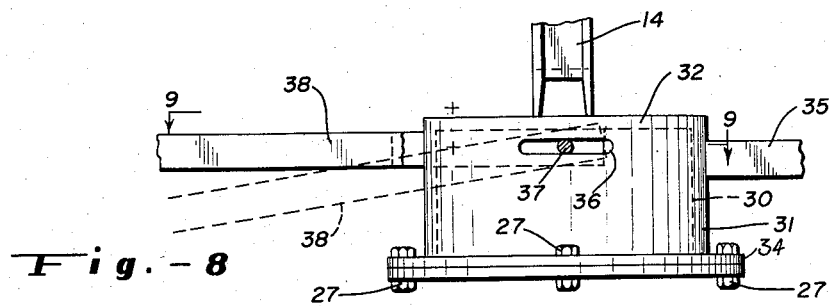
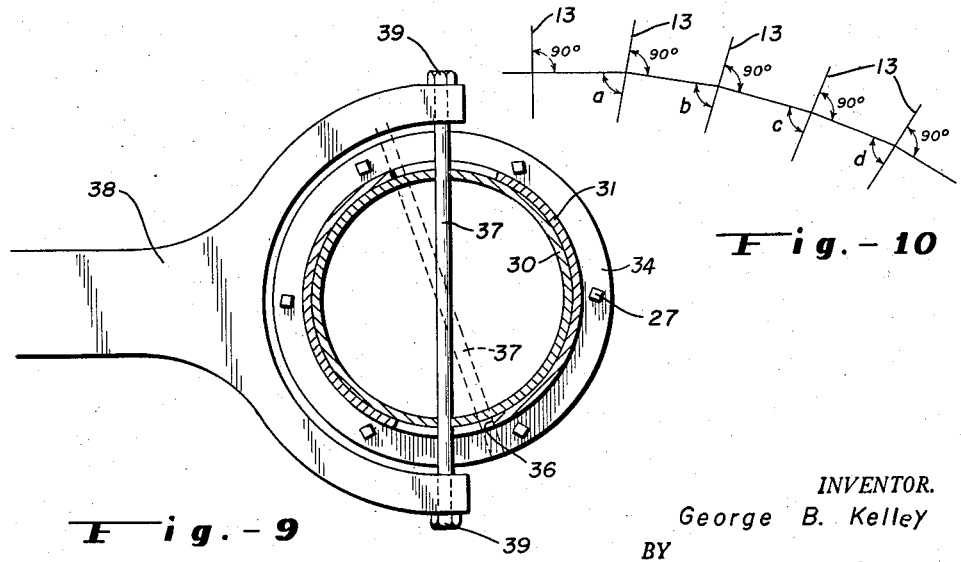
INVENTOR.
George B. Kelley
BY
ATTORNEYS

United States Patent Office 2,880,847
Patented Apr. 7, 1959

2,880,847

FLEXIBLE CONVEYOR

George B. Kelley, Denver, Colo.

Application April 21, 1955, Serial No. 502,880

8 Claims. (Cl. 198—109)

This invention relates to conveyors for separable articles, and more particularly to conveyors having a substantially continuous surface which may be curved from a straight line of travel without additional components and without impairing the carrying efficiency of the surface.

Conveyors have been known which utilize a series of sections where each section includes a plurality of endless belts mounted for rotation on rollers and so arranged that every other belt on the roller extends in an opposite direction. Each section, therefore, mutually shares its rollers with its adjoining neighbor's, forming a continuous conveying surface of the belts. Such conveyors are useful for conveying separable articles such as bags, boxes, small or medium sized objects, etc. It has been proposed to make flexible conveyors of such units by having a horizontally turning swivel in the conveyor frame midway between two adjoining rollers so that only one series of the belts extend over the swivels. With such a swivel arrangement, the conveying surface may be horizontally curved or bent away from a straight line of travel. This curving of the conveying surface is accomplished without the use of additional components such as side boards, and the like, to keep the articles on the surface, and, further, such a conveyor may be curved or bent while the conveyor is in operation.

The flexible conveyor of the present invention may provide a temporary conveyor for those situations where a permanent installation is not feasible. In loading and unloading freight cars, trucks, and the like, the flexible conveyor may be curved or bent from a side door to the end of the storage space of the vehicle, or it may be moved around during actual use, to facilitate the handling of material in such dead end spaces. The flexible conveyors are, also, very useful in permanent or semipermanent installations where curves and bends are necessary for the conveyor, since conveyed articles may be placed more or less haphazardly on the conveying surface without danger of bumping into side walls or falling off the conveyor.

The present invention is an improvement in known flexible conveyors utilizing mutual rollers between sections of series of endless belts. The sections of belts are mounted on a frame which has a series of frame sections extending lengthwise and joined by swivels so that the frame sections may be moved in angular relation to one another. The swivel or hinge is provided immediately below each roller and is so mounted that one of the sections of the frame connected to the swivel is always perpendicular to the axis of rotation of the roller while the oppositely extending section of the frame may be moved in angular relation to the swivel and to the axis of rotation of the roller. By having the axis of the roller always perpendicular to the one frame section, the endless belts which extend in the same direction as the perpendicular frame will extend away from the roller substantially perpendicularly to the axis of the roller. The endless belts extending in the diametrically opposite direction, however, will extend away from the roller at an angle equal to the variable angle of the other frame section. The belts engaging the roller in a perpendicular direction prevent other belts from creeping off the roller. Even where an outside belt jumps the rollers, the perpendicularly extending belts will prevent the other belts from creeping to the end and jumping off the roller, disrupting the conveying surface. The construction of the frame is simple and provides a strong joint which is capable of long spans between supporting uprights. Further, the novel frame does not require the use of side braces or stops to prevent it from being bent or curved too much, which causes the belts to jump off the rollers. A novel swivel or hinge permits not only horizontal turning but also vertical turning of the adjoining sections of a frame. Means may be provided in the swivel itself to limit the angular rotation of the adjoining parts of the frame and define the limits of turning thereof. The vertical turn or bending of the frame permits elevating the conveyor where it is necessary.

Included among the objects and advantages of the present invention is an improved flexible conveyor having plural sections of a series of substantially parallel endless belts extending between two rollers which are common to adjacent sections of belts, the rollers being mounted on a frame which is sectioned and joined by swivels placed directly beneath each roller. The rollers are so arranged as to be perpendicular to one section of its juxtaposed frame and to be angularly variable with the other section of the juxtaposed frame. The invention includes a novel swivel which permits vertical raising or lowering of the conveyor, as well as horizontal turning or bending thereof. The hinge or swivel is arranged so as to have one series of belts intercepting its juxtaposed roller perpendicularly from one side and the other series of belts intercepting the roller at a variable angle from the opposite side thereof, so that the perpendicularly intercepting belts prevent the creeping of the angularly intercepting belts.

These and other objects and advantages of the present invention may be readily ascertained by referring to the following description and illustrations in which:

Fig. 7 is a top plan view, in partial section, of a swivel according to the invention;

Fig. 8 is a side elevation of a modified swivel according to the invention;

Fig. 9 is a top plan view in partial cross section of a swivel according to Fig. 8; and Fig. 10 is a schematic view of an assembly illustrating the angular position of the axes of the rollers in relation to the frame members.

Figure 2:
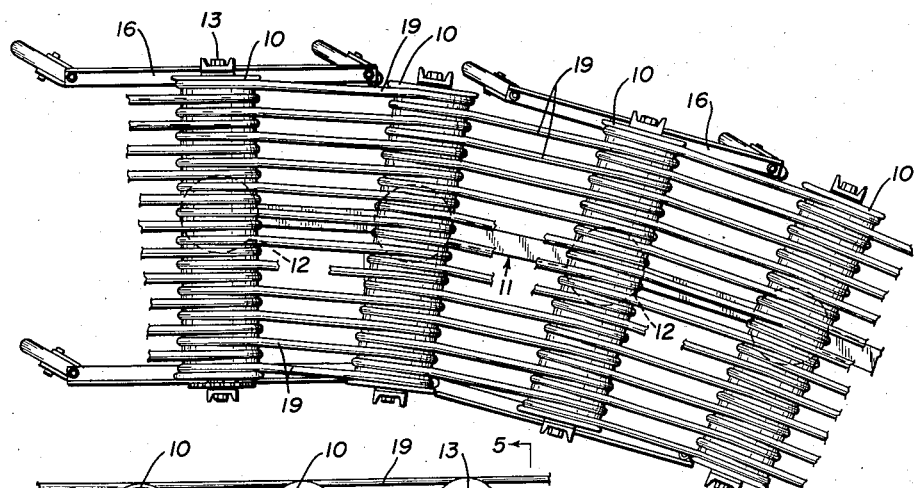
Fig. 2 is a top plan view of a portion of the flexible conveyor illustrating the bending movements of the conveyor in relation to the belts thereon.
Figure 3:
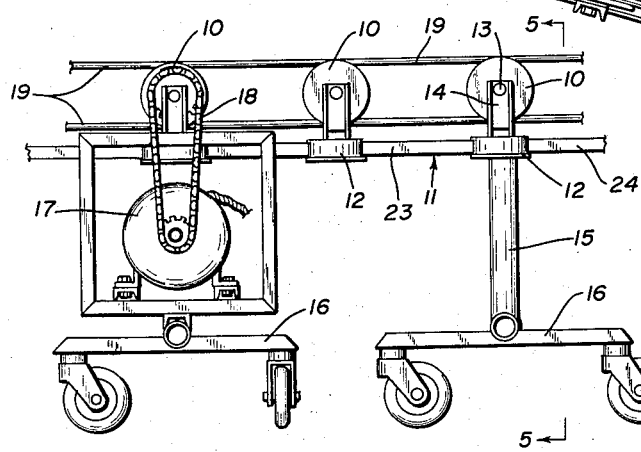
Fig. 3 is a side elevation of a flexible conveyor according to the invention illustrating the drive means and a mobile mount of the conveyor frame.
Figure 4:
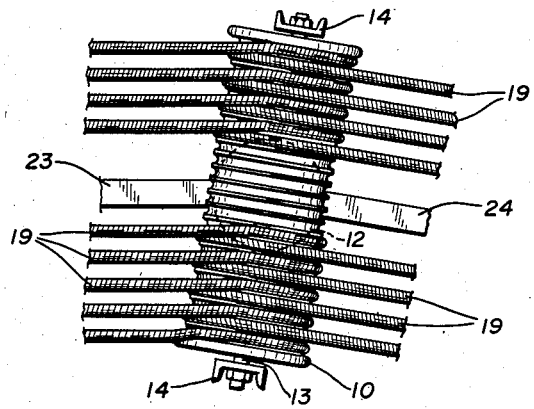
Fig. 4 is a partial top plan view of a detail of the rollers and frame illustrating the angular arrangement of the intercepting belts on a roller at about maximum turning of the adjacent rollers.
Figure 5:
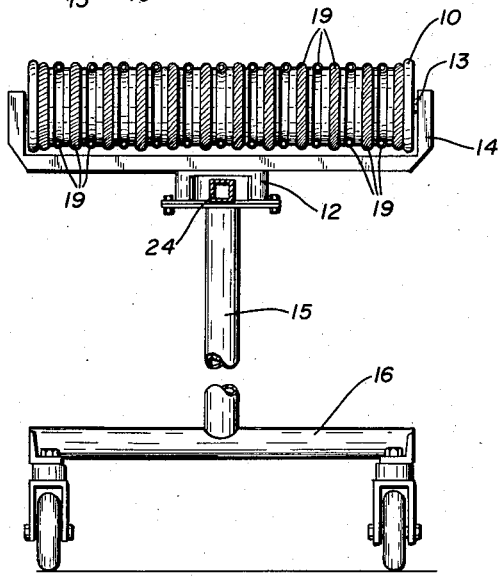
Fig. 5 is an end elevation, in partial section, of a conveyor illustrating the mounting of the roller on a swivel joint.

In the device illustrated in Figs. 2–4, a series of grooved rollers 10 is mounted on an articulated frame shown in general by numeral 11. The frame 11 includes a series of frame sections 23 and 24 interconnected to swivels 12, and the rollers 10 are mounted on bifurcated roller supports 14 mounted directly on the swivels 12. The frame is supported on upright members 15 which are mounted on a wheeled mount 16 for portability of the conveyor. A motor 17 is mounted on one wheeled base 16 and drives the conveyor by means of a chain or other appropriate drive 18 secured to one of the rollers of the series. A series of substantially parallel endless belts 19 extend between adjacent rollers 10 and form the conveyor surface. The belts 19 are so arranged that alternate belts on a roller extend in opposite directions to the adjoining rollers, which perform as a substantially continuous moving surface for conveying articles thereon.

Figure 1:
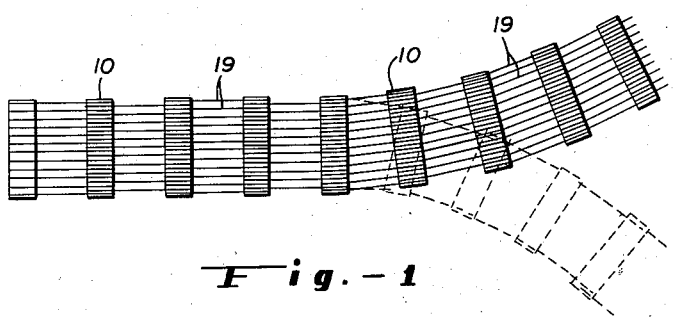
Fig. 1 is a schematic plan view of the flexible conveyor illustrating the relative bending of the various sections thereof.

The belts 19 are, in the preferred form, helical spring members arranged as endless belts which are stretchable. The belts must be stretchable between adjoining rollers so that the axis of the rollers may be moved in angular relation to one another whereby there is a stretching of one half of the belts and a compressing of the other half of the belts. In other words, the belts must stretch and contract to permit the rollers to turn and so as to bend the conveying surface. The bending of the conveyor is illustrated schematically in Fig. 1 which shows that the conveyor can be curved in either direction. Since the belts stretch and contract, the conveyor can be curved or bent while it is running without hampering the movement of the belts on the rollers or without impairing the carrying capacity of the rollers. Further, since the belts are stretched between the rollers, sufficient frictional force exists between the belts and the rollers so that driving a single roller will drive the remaining rollers in a series. Note that the belts are of such a size that they must be stretched to be mounted on the rollers to permit contracting of the belts and, also, further stretching on bending the frame.

Figure 6:
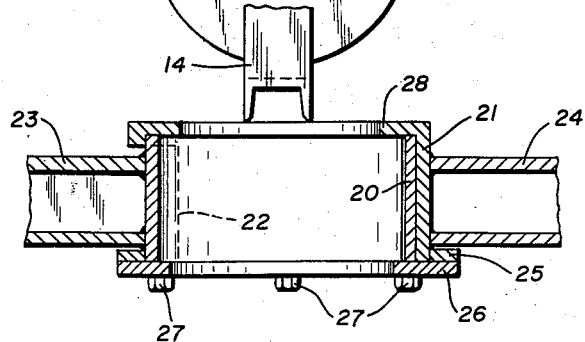
Fig. 6 is a cross sectional view of a swivel for the conveyor frame according to the invention.

The swivel illustrated in Figs. 6 and 7 comprises an inner cylindrical member or tube 20 and an encompassing tube 21 which is sufficiently large to support the inner tube 20 and to permit rotation thereof. The outer tube 21 has an opening 22 in one side thereof, which is substantially wider than the width of a section of the frame 23. The section of frame 23 is connected through the opening 22 to the exterior of the inner cylinder 20, as by welding or the like, and another section of frame 24 is secured to the exterior of the outer tube 22. The frame section 24 is secured on the side diametrically opposite the opening 22. The outer tube 21 has a flange 25 thereon, and a cover plate 26 secured by means of bolt and nut assemblies 27 maintains the tubes in secured position. The outer tube 21 has a top, internally extending flange 28 which prevents movement of the inner tube in an upward direction. The bifurcated roller support 14 is mounted on the top flange 28 of the swivel, and is placed so that the axis of the roller is perpendicular to a central, longitudinal plane of the frame member 24. The edges of the opening 22 act as stops for the member 23 to limit the relative rotation of the inner cylindrical member 20 and the outer member 21. However, additional stops may be provided, as by set screws 29 secured in the exposed portions of the inner tube 21 so as to provide a different angular rotation. For certain installations, it may be desirable to have a series of staggered holes which can be utilized by the set screws 29 to provide variable stops for a variable angular movement. The construction of Figs. 6 and 7 maintains the roller shaft 13 in a position perpendicular to the plane of the longitudinal axis of frame member 24, while it is variable to the plane of the longitudinal axis of the frame member 23. In Fig. 4, a roller 10 is illustrated with its axis 13 perpendicular to the plane of the longitudinal axis of frame member 24 and at an angle to the longitudinal axis of the frame member 23. The belts 19 extending to the right of the roller contact the roller at a perpendicular angle, while the belts leaving the roller to the left contact the belt at an acute angle thereto. This arrangement provides a means for preventing the creeping of the belts off the roller. Since the belts extending to the right contact the roller at a perpendicular angle, they will have no tendency to creep sidewise off the roller. The belts on the left, however, contact the roller at an angle and will have a definite tendency to creep off the roller towards the inside of the curve. Therefore, even though the lower belt is hooked and pulled off the roller, the belts extending to the right will have no tendency to leave the grooves and will, therefore, prevent the belts extending to the left from creeping off the roller.

The relation of the axes of the rollers to the frame members is illustrated schematically in Fig. 10 wherein a series of roller shafts 13 are placed across a series of frame sections. Each shaft is perpendicular to the frame extending to the right thereof, but is variable to the frame extending to the left thereof. Thus, angles $a$, $b$, $c$, and $d$ will be variable, but on the opposite side of the roller the angle of the axis to the frame will always be 90 degrees. This relation illustrates that one series of belts leaves each roller at a perpendicular angle whereas the other series of belts leaves each roller at a variable angle. Each roller, therefore, has an automatic preventative for creeping belts.

The modified swivel illustrated in Figs. 8 and 9 includes an inner cylinder or tube 30 and an outer tube 31 telescoped over the inner tube. The outer tube has a top portion 32, which prevents the exit of the inner tube in that direction, and a cover plate 33 secured to a flange 34 for preventing the exit of the inner tube from the lower portion thereof. The bottom plate 33 is secured to the flange by means of bolt and nut assemblies 27. As is the case with the horizontal swivel of Figs. 6 and 7, the bifurcated roller support 14 is secured to the top of the swivel in a plane which supports the axis of a roller which is perpendicular to the longitudinal axis of a frame member 35 which is interconnected with the outer tube 31. A pair of elongated slots 36 are placed on diametrically opposite sides of the outer tube 31, and a shaft 37, secured to a bifurcate frame section 38, extends through the slots through diametrically opposed tight fitting holes in the inner tube 30, and the shaft is secured in place by means of fastening nuts 39. The inner tube 30 rotates freely in the outer tube 31 so that the bifurcate frame member may turn in relation to the outer member, as indicated by the dotted line 37 of the shaft, Fig. 9. The horizontal angular displacement of the frame 38 is determined by the length of the slots 36 or by the distance between retaining screws, similar to those illustrated in Fig. 7. The frame section 38 is also vertically rotatable about the shaft 39, so that it is movable in a vertical displacement, indicated by the dotted lines 38 of Fig. 8. This swivel, therefore, gives both horizontal bending and a vertical bending for the conveyor, while still retaining the important feature of having the shaft of the roller maintained at a perpendicular angle to one of the frame sections mounted on each swivel.

Swivels of the present invention being made of tubular stock are inexpensive to manufacture, easy to maintain, and of sufficient strength to span substantial lengths between the upright supports. They provide, furthermore, an effective and an inexpensive swivel for three dimensional movement of a conveyor.

While the invention has been illustrated by reference to specific devices, there is no intent to limit the invention to the precise details so described, except insofar as set forth in the following claims.

I claim:

1. A conveyor for separable articles comprising an elongated wheel-supported frame formed of lengthwise extending sections interconnected by swivel members at intervals along the length of said frame so as to permit angular movement of one section relative to its adjoining sections, a series of grooved rollers supported above the frame and journalled for rotation about axes substantially above the top surface of said sections, each said roller being in alinement with the vertical plane of an associated swivel, a series of flexible, endless belt members interconnecting adjoining rollers of the series and so arranged lengthwise of the roller that alternate belt members extend in opposite directions therefrom, each said swivel comprising two telescoping cylindrical members connected respectively to adjoining members of the frame extended in opposite directions from the swivel joint, a roller-supporting member in fixed connection with one of said cylindrical members and extending upwardly so as to maintain the axial position of said roller in a plane perpendicular to the lengthwise axis of one associated frame section while permitting variation in angular relation of the other said associated frame section.

2. A conveyor for separable articles comprising an elongated wheel-supported frame formed of lengthwise extending sections interconnected by swivel members at uniform intervals along the length of said frame so as to permit angular movement of one section relative to its adjoining sections, a series of grooved rollers supported above the frame and journalled for rotation about axes substantially above the top surface of said sections, each said roller being in alinement with the vertical plane of an associated swivel, a series of flexible, endless belt members interconnecting adjoining rollers of the series and so arranged lengthwise of the roller that alternate belt members extend in opposite directions therefrom, each said swivel comprising two telescoping cylindrical members connected respectively to adjoining members of the frame extended in opposite directions from the swivel joint, a roller-supporting member in fixed connection with one of said cylindrical members and extending upwardly so as to maintain the axial position of said roller in a plane perpendicular to the lengthwise axis of one associated frame section while permitting variation in angular relation of the other said associated frame section.

3. A conveyor for separable articles comprising an elongated wheel-supported frame formed of lengthwise extending sections interconnected by swivel members at uniform intervals along the length of said frame so as to permit angular movement of one section relative to its adjoining sections, a series of grooved rollers supported above the frame and journalled for rotation about axes substantially above the top surface of said sections, each said roller being in alinement with the vertical plane of an associated swivel, a series of flexible, endless spring belt members interconnecting adjoining rollers of the series and so arranged lengthwise of the roller that alternate belt members extend in opposite directions therefrom providing a substantially continuous surface, each said swivel comprising two telescoping tubular members connected respectively to adjoining members of the frame extended in opposite directions from the swivel joint, a roller-supporting member in fixed connection with the exterior said tubular member and extending upwardly so as to maintain the axial position of said roller in a plane perpendicular to the lengthwise axis of the associated frame section connected to said exterior tubular member while permitting variation in angular relation of the other said associated frame section.

4. A conveyor for separable articles comprising an elongated wheel-supported frame formed of lengthwise extending sections interconnected by swivel members at intervals along the length of said frame so as to permit angular movement of one section relative to its adjoining sections, a series of grooved rollers supported above the frame and journalled for rotation about axes substantially above the top surface of said sections at intervals along the frame, each said roller being in alinement with the vertical plane of an associated swivel, a series of flexible, endless spring belt members interconnecting adjoining rollers of the series and so arranged lengthwise of each roller that alternate belt members extend in opposite directions therefrom providing a substantially continuous surface, each said swivel comprising two telescoping tubular members connected respectively to adjoining members of the frame extended in opposite directions from the swivel joint, a bifurcated roller-supporting member in fixed connection with the exterior said tubular member and extending upwardly so as to maintain the axial position of said roller in a plane perpendicular to the lengthwise axis of the associated frame section connected to said exterior tubular member while permitting variation in angular relation of the other said associated frame section.

5. In the conveyor art in which an object conveying surface is carried on a self-supporting frame for swinging movements in the horizontal plane at intervals throughout the length of the conveyor assembly, a swivel joint connecting adjoining portions of said frame comprising an inner cylindrical member of substantial vertical extent and arranged to be interconnected to a first portion of said frame and mounted with its axis in a substantially upright position, a tubular member rotatably telescoped over and encompassing said cylindrical member, a second portion of said frame being rigidly interconnected to said tubular member, there being at least one elongated, lateral opening in said tubular member cooperative with the first frame portion whereby said inner cylindrical member is rotatable through an arc in said tubular member, said members having coacting means to limit rotation of said inner member, and means for maintaining said cylinders in telescoped relation.

6. In the conveyor art in which an object conveying surface is carried on a self-supporting frame for swinging movements in the horizontal plane at intervals throughout the length of the conveyor assembly, a swivel joint connecting adjoining portions of said frame comprising an inner cylindrical member of substantial vertical extent secured to a first portion of said frame and mounted with its axis in a substantially upright position, a tubular member rotatably telescoped over and encompassing said cylindrical member, a second portion of said frame rigidly interconnected to said tubular member, there being an elongated, lateral opening in said tubular member accommodating said first frame portion, said opening being substantially wider than said first frame portion whereby said inner cylindrical member is rotatable through an arc in said hollow tubular member, said members having coacting means to limit rotation of said inner member, and cover means secured to the outer tubular member for maintaining said cylinders in telescoped relation.

7. In the conveyor art in which an object conveying surface is carried on a self-supporting frame for swinging movements in the horizontal plane at intervals throughout the length of the conveyor assembly, a swivel joint connecting adjoining portions of said frame comprising an inner cylindrical member of substantial vertical extent interconnected by a shaft to a bifurcated end of a first portion of said frame and mounted with its axis in a substantially upright position, said first portion being vertically rotatable about said shaft, a tubular member rotatably telescoped over and encompassing said cylindrical member, a second portion of said frame being interconnected to said tubular member, there being diametrically opposed elongated, lateral openings in said tubular member substantially wider than said shaft whereby said inner cylindrical member is rotatable in said tubular member, said members having coacting means to limit the arc of rotation of said inner member, and means for maintaining said cylinders in telescoped relation.

8. In the conveyor art in which an object conveying surface is carried on a self-supporting frame for swinging movements in the horizontal plane at intervals throughout the length of the conveyor assembly, a swivel joint hingably connecting adjoining portions of said frame comprising an inner cylindrical member of substantial vertical extent arranged to be rigidly interconnected to a first portion of said frame and mounted with its axis in a substantially upright position, a tubular member telescoped over and encompassing said inner cylindrical member, a second portion of said frame being rigidly interconnected to said tubular member, there being at least one elongated, lateral opening extending partially around the circumference of said tubular member cooperative with said first frame portion whereby said inner cylindrical member is rotatable through an arc in said tubular member, the boundaries of said opening and said first frame portion coacting to limit rotation of said inner member, and means for maintaining said cylinders in telescoped relation.

References Cited in the file of this patent

UNITED STATES PATENTS

| | | |
|---|---|---|
| 1,785,402 | Arentzen | Dec. 16, 1930 |
| 2,250,933 | Manierre | July 29, 1941 |
| 2,260,587 | Shields | Oct. 28, 1941 |
| 2,525,555 | Manierre | Oct. 10, 1950 |